United States Patent [19]
Eastwood

[11] Patent Number: 5,609,893
[45] Date of Patent: Mar. 11, 1997

[54] PROBE ASSEMBLY FOR INJECTION MOLDING APPARATUS

[75] Inventor: Gregg Eastwood, Alta Loma, Calif.

[73] Assignee: JK Molds, Inc., Upland, Calif.

[21] Appl. No.: 372,045

[22] Filed: Jan. 12, 1995

[51] Int. Cl.⁶ .................................................. B29C 45/20
[52] U.S. Cl. ...................... 425/549; 264/328.15; 425/568
[58] Field of Search ................................. 425/549, 568; 264/328.15

[56]  References Cited

U.S. PATENT DOCUMENTS

| | | | |
|---|---|---|---|
| 4,161,386 | 7/1979 | Osuma-Diaz | 425/549 |
| 4,501,550 | 2/1985 | Nikkuni | 425/549 |
| 4,517,453 | 5/1985 | Tsutsumi | 219/421 |
| 4,563,149 | 1/1986 | Landis | 425/547 |
| 4,729,733 | 3/1988 | Schmidt | 425/549 |
| 4,740,151 | 4/1988 | Schmidt et al. | 425/549 |
| 4,818,217 | 4/1989 | Schmidt et al. | 425/549 |
| 5,002,480 | 3/1991 | Gellert | 425/549 |
| 5,049,062 | 9/1991 | Gellert | 425/549 |
| 5,098,280 | 3/1992 | Trakas | 425/549 |
| 5,324,191 | 6/1994 | Schmidt | 425/549 |
| 5,421,716 | 6/1995 | Gellert | 425/549 |

Primary Examiner—Tim Heitbrink
Attorney, Agent, or Firm—Wagner & Middlebrook

[57] ABSTRACT

A temperature and molding material pressure compensated probe for use in injection molding apparatus. The probe includes a two-part telescoping body with a molding material filled space therebetween. Longitudinal thermal expansion which formerly presented sealing problems only results in changes in the extent of telescoping overlap. Molding material pressure is applied equally to both probe parts tending to improve sealing. The molding material filled space has a greater transverse area than all outlets and passages.

35 Claims, 8 Drawing Sheets

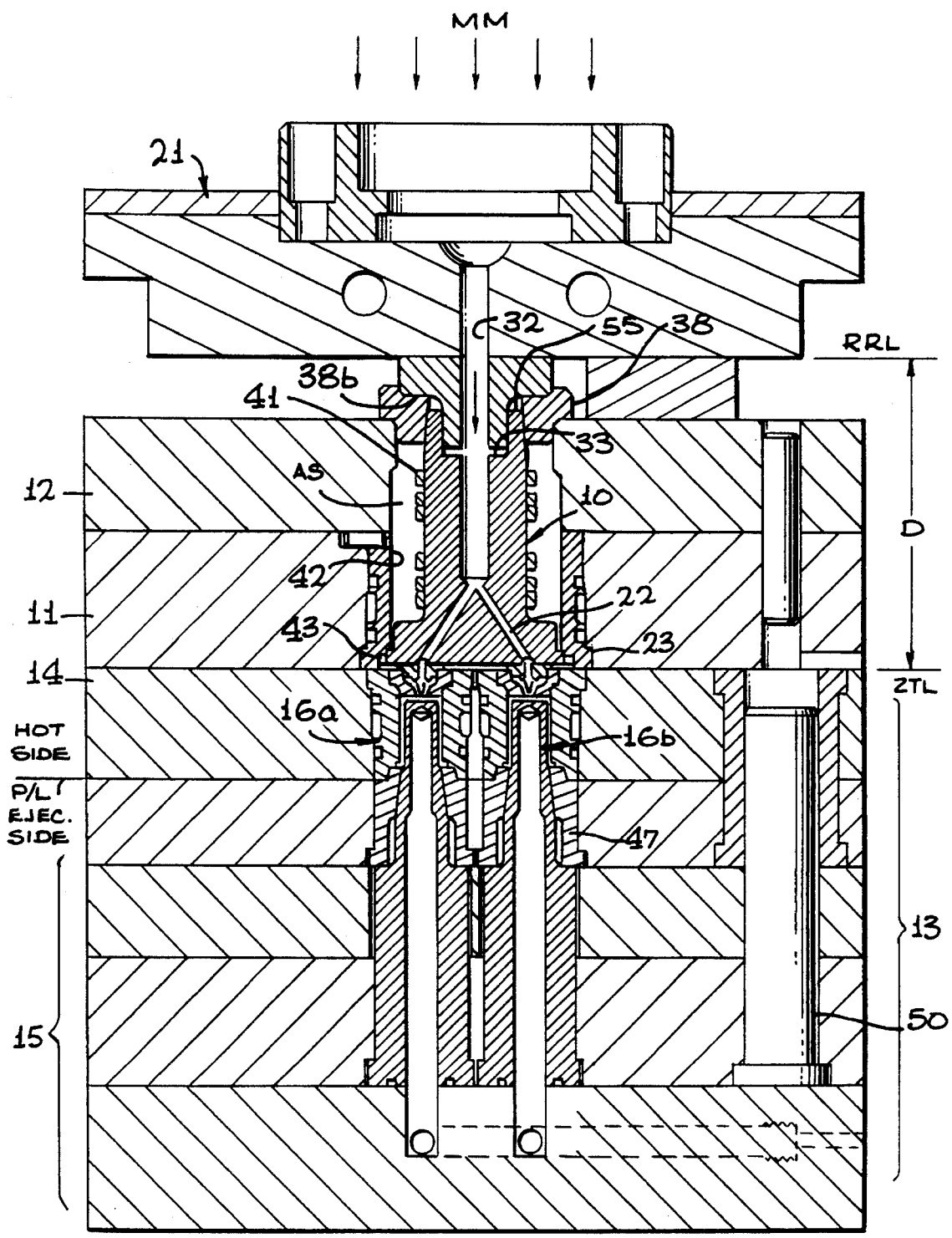

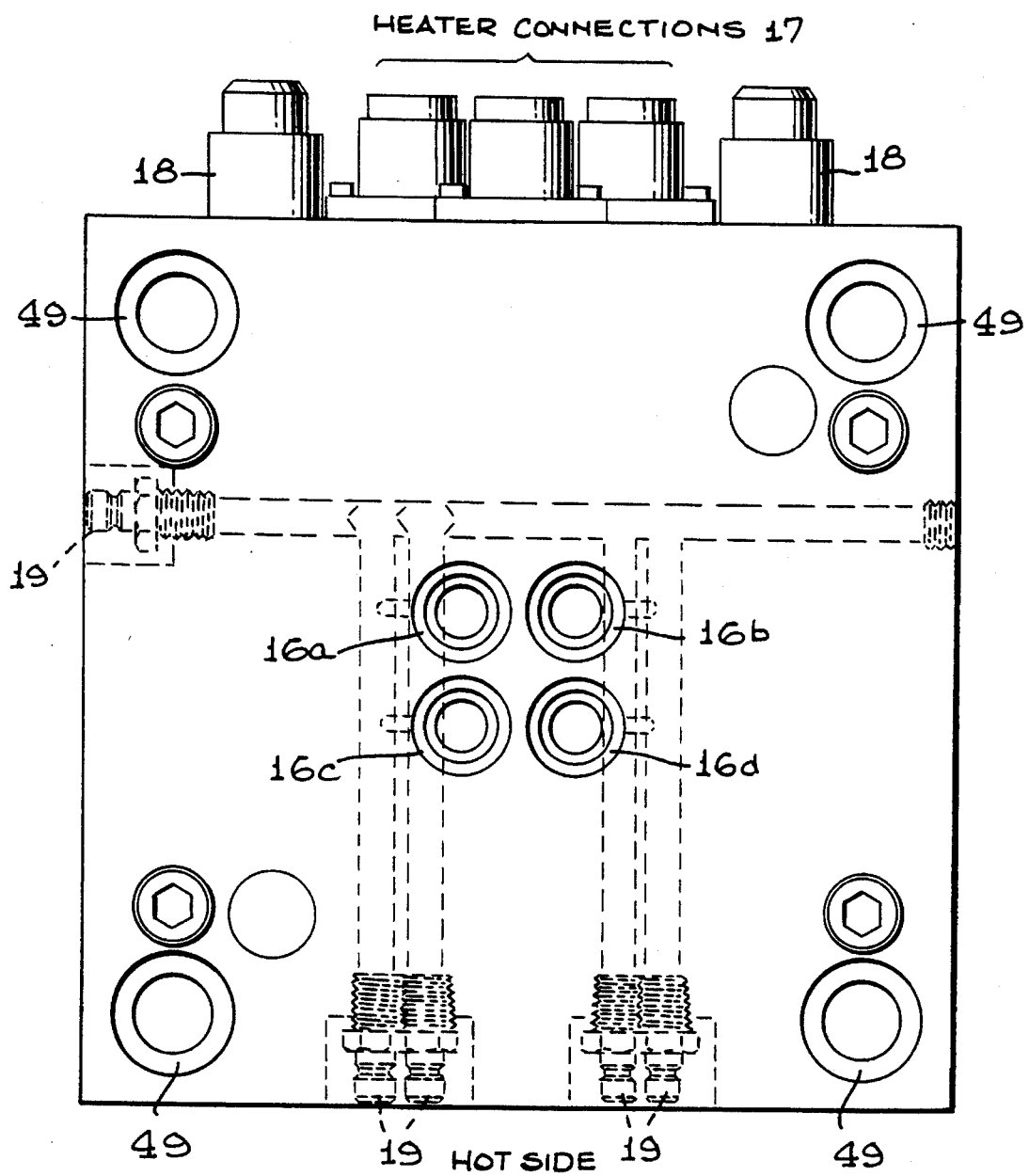

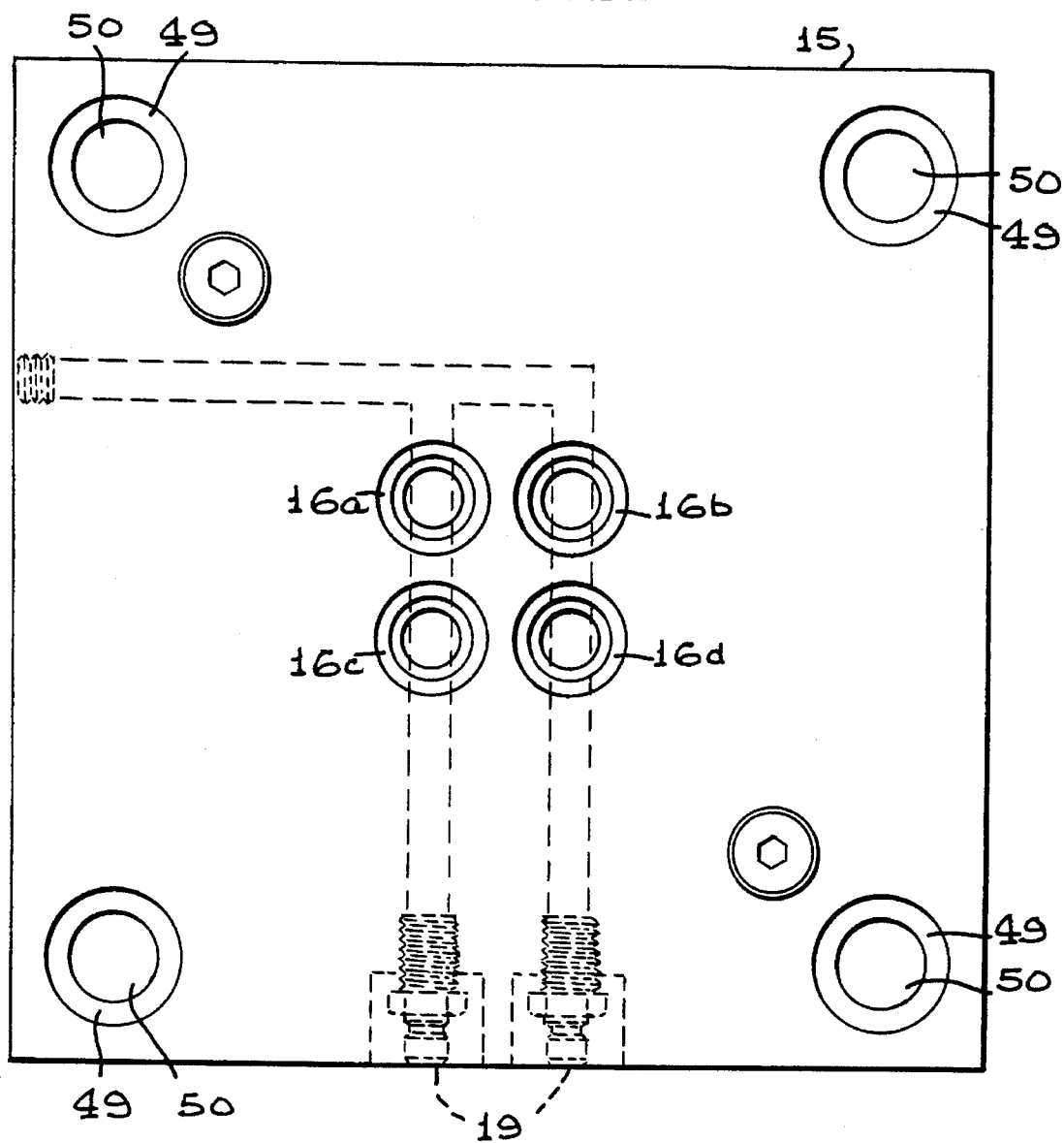

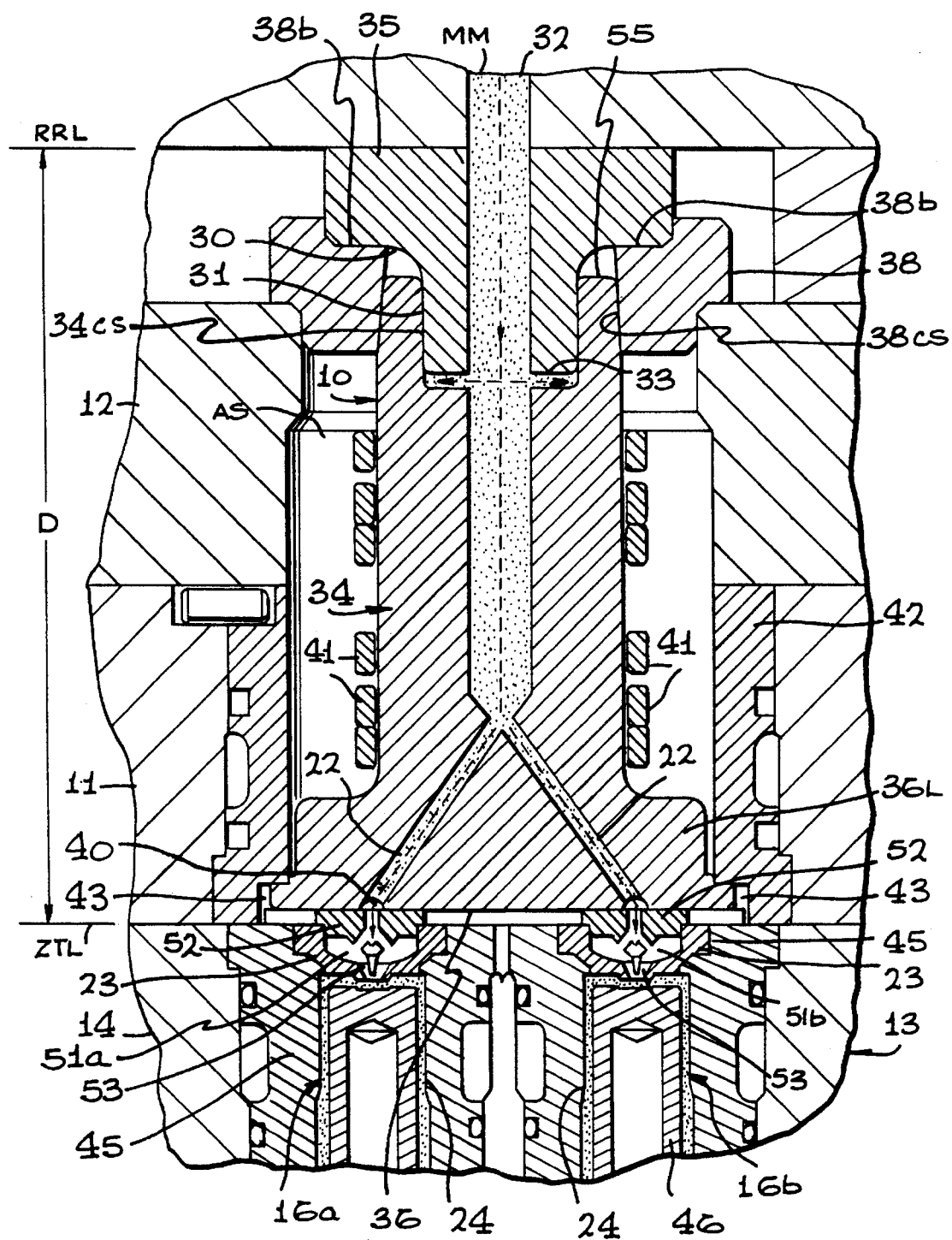

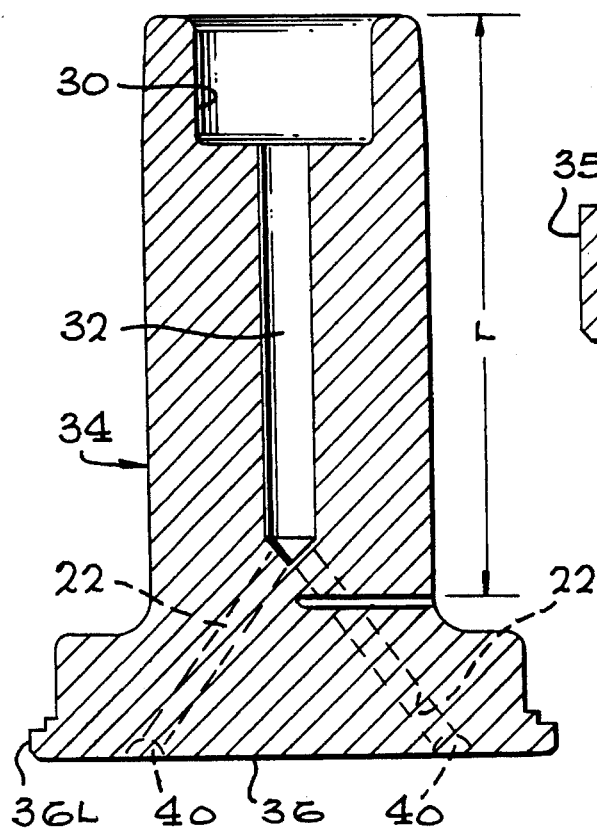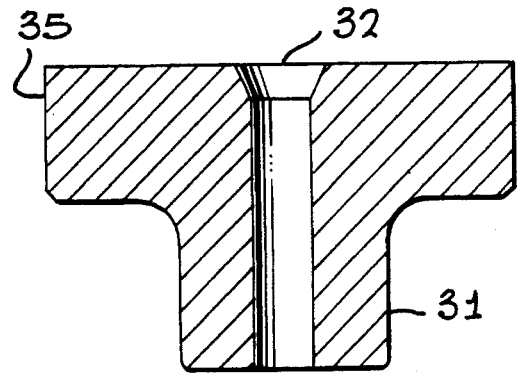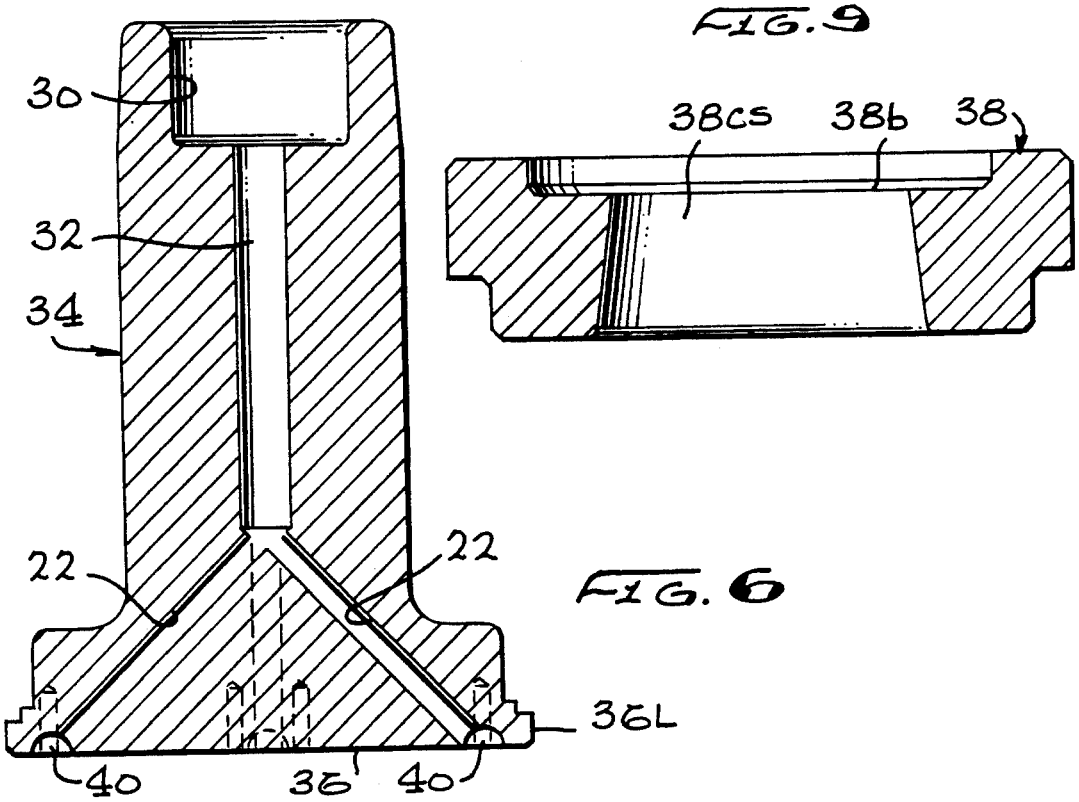

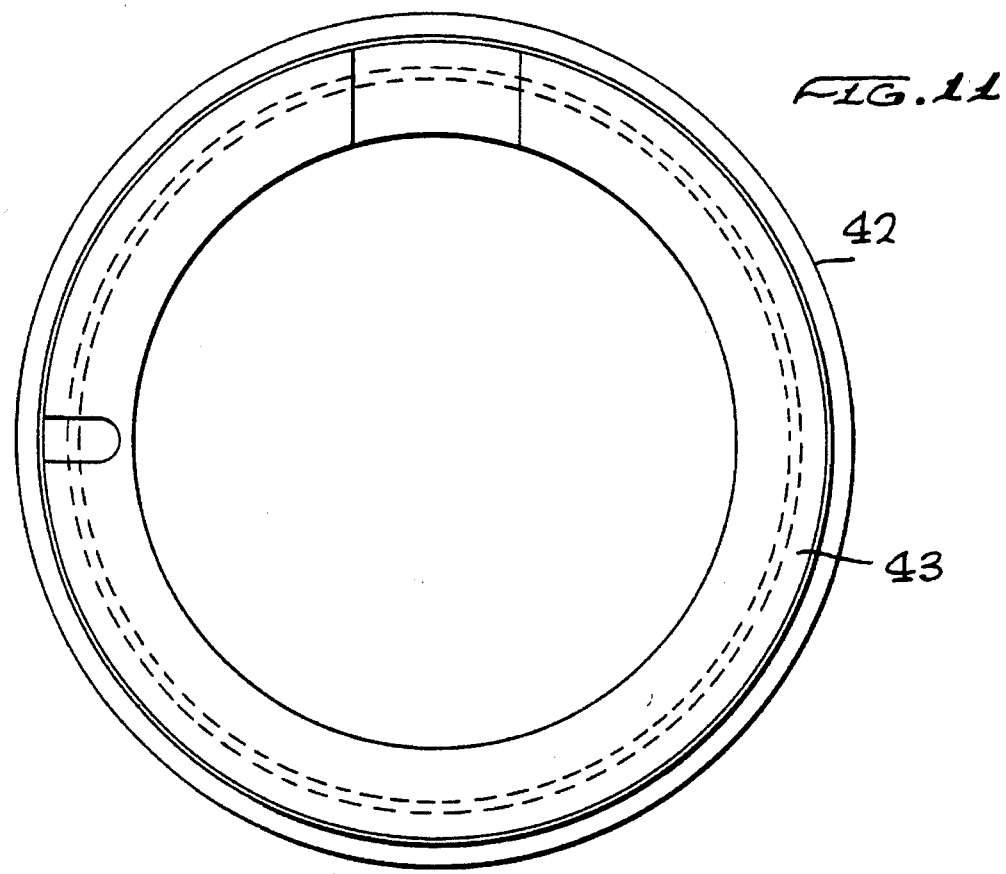
FIG. 11
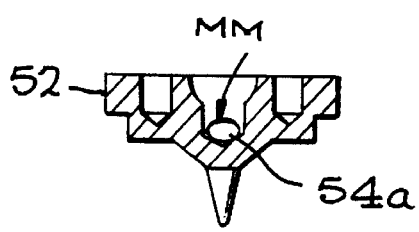
FIG. 14
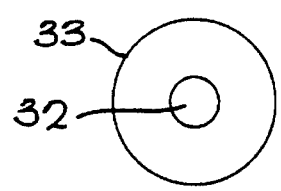
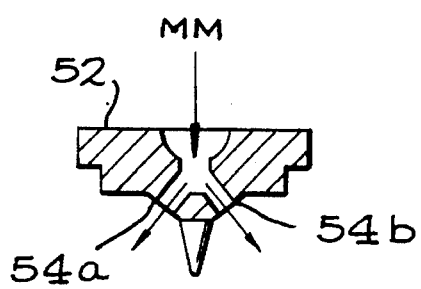
FIG. 15
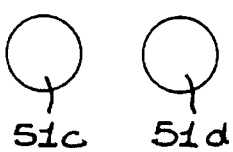
FIG. 18

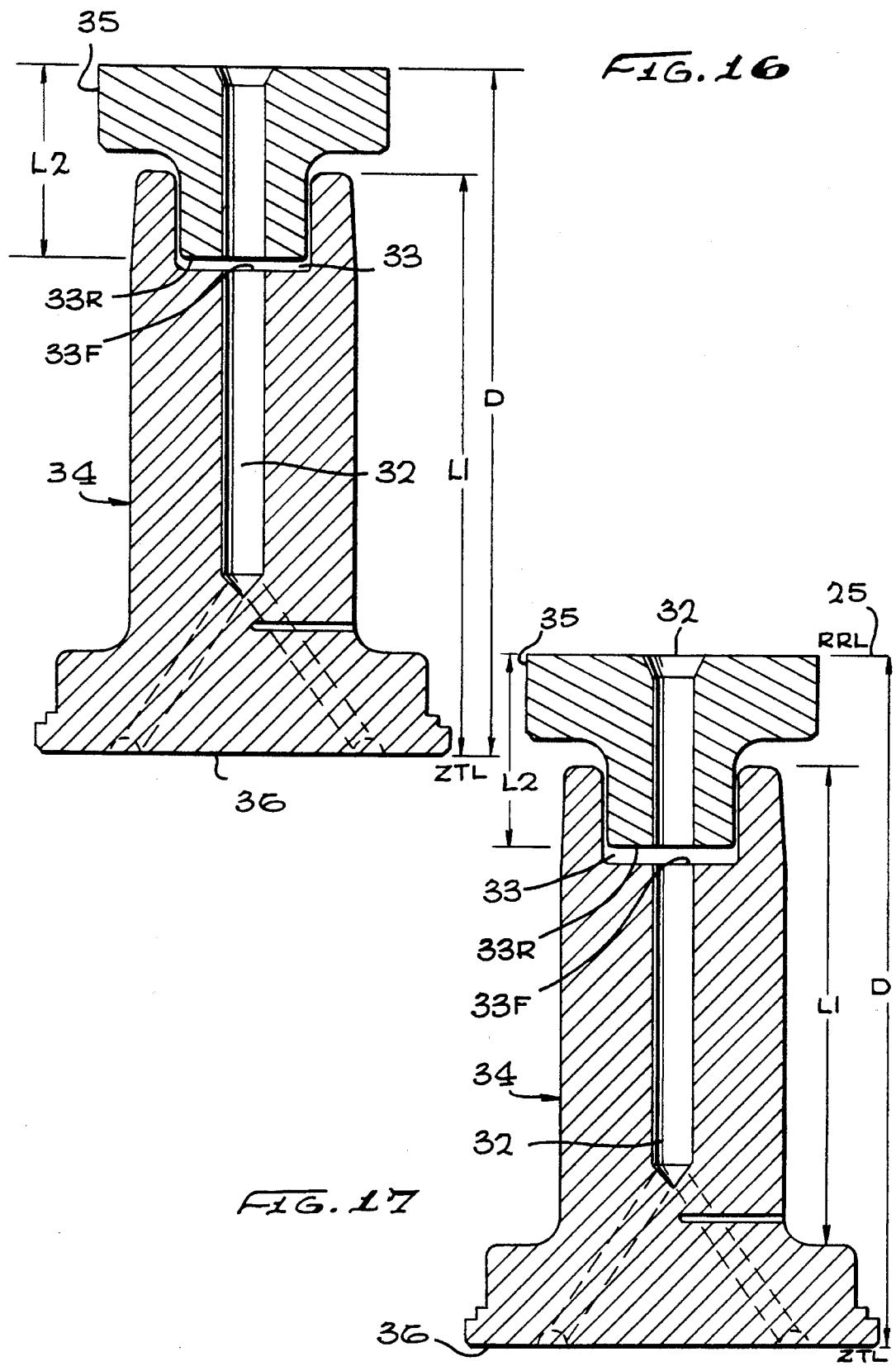

PROBE ASSEMBLY FOR INJECTION MOLDING APPARATUS

BACKGROUND OF THE INVENTION

In the field of injection molding, particularly in multi-cavity molds of as many as 128 cavities, there has risen a problem that is heretofore unrecognized. That is, the molding pressure applied from a manifold is multiplied many times by the areas of the probe, runners, gate, and outlets with many of these areas applying force which tends to separate the probe assembly from the mold. On occasion, the separation force exceeds the capacity of the molding apparatus.

Additionally, it has been common practice to design a probe assembly with a large cavity adjacent to the mold gate. When this cavity is filled with molten molding material, the molding material exerts separating pressures which may exceed the holding strength off the molding machine fasteners or locking devices. Even if the molding apparatus is capable of retaining the assembly together, changes in temperature such as cooling after a molding operation can allow molding material to enter a seam line similar to flash in molding and then upon reheating, the material in the seam line acts as a block against precise, tight mold assembly. Repeated temperature cycling inherent in the molding process only aggravates the problem.

Also, proper temperature compensation of probe assemblies has been difficult, if not impossible, to achieve using existing probe designs. The only solution has been to design probes with the front face acting as a reference so that the probe is free to expand and contract in a rearward direction away from the mold and toward the molding material manifold.

BRIEF DESCRIPTION OF THE INVENTION

I have faced this state of the art and this critical problem present in the use of multi-cavity injection molds and have solved each of these problems in my design of a new probe assembly. This invention involves a new probe assembly for use in single or multi-cavity injection molding and is useful wherever the force tending to separate the hot side of the mold from the injector plate can become excessive. The use of this invention is likewise desirable wherever thermal expansion of the probe due to thermal cycling throughout the normal molding operation so that longitudinal expansion of the probe can affect the mold injector plate joint integrity. While these problems are more likely to exist in multi-cavity molding operations, the features of this invention are, however, equally useful in single cavity molding systems, as well.

The desirable effects of this invention are achieved by designing the path of the molding material from the manifold to the point of injection to provide for pressure balancing within the probe.

Each of the foregoing highly desirable features or characteristics is accomplished in a two-part body probe with the parts overlapping or telescoping in a longitudinal direction with respect to the molding material flow from a supply manifold to the mold hot side. The telescoping parts of the probe body define an annular recess in the molding material passage from the molding material supplying manifold to the mold proper. The annular recess has a cross sectional area in a direction normal to the longitudinal axis of the probe assembly larger than any other of the molding pressure regions between the manifold and the mold proper.

One feature of this invention resides in the presence of the cross sectional dimensional relationship to the runners, gates and an internal cavity which acts as an internal reservoir of molding material tending to balance molding forces within the probe.

Another feature relates to the overlapping or telescoping form of the probe body whereby thermal expansion occurs within the probe body without change in the overall length of the probe despite dramatic changes of probe temperature.

A further feature of the invention is the presence of the internal recess or reservoir between the telescoping parts to accommodate the change in volume of the probe due to thermal expansion without any change in the distance between the reference planes defined by the mold body and the molding material manifold.

Another feature of this invention resides in the tapered contact region between the probe body parts which maintain good thermal transfer despite changes in probe body thermal expansion.

BRIEF DESCRIPTION OF THE DRAWING

This invention may be more clearly understood from the following detailed description and by reference to the drawing, in which:

FIG. 1 is a horizontal sectional view along the flow path of a probe assembly in accordance with this invention;

FIG. 2 is a plan view of the hot side thereof;

FIG. 3 is a plan view of the ejector side thereof;

FIG. 4 is an enlarged section through the probe of this invention and associated mold during a mold cycle;

FIG. 5 is a diametrical sectional view of the outer probe body;

FIG. 6 is a second diametrical sectional view of the outer probe body taken along a plane at 45 degrees with respect to the lane of the section of FIG. 5;

FIG. 7 is a diametrical sectional view of the inner probe body of the probe of this invention;

FIG. 9 is diametrical sectional view of the probe locator of this invention;

FIG. 11 is a front elevational view of the housing of FIG. 10;

FIG. 14 is a diametrical sectional view of the gate tip of FIG. 13 taken along line 14—14 of FIG. 13;

FIG. 15 is a diametrical sectional view of the gate tip of FIG. 13 taken along line 15—15 of FIG. 13;

FIGS. 16 and 17 are diametrical sectional views of the probe body of FIGS. 5 and 7 shown with different degrees of thermal expansion during molding operation; and FIG. 18 is a simplified graphical representation of the relative sizes of the various molding material filled recesses during molding operation.

DETAILED DESCRIPTION OF THE INVENTION

Figure 8:
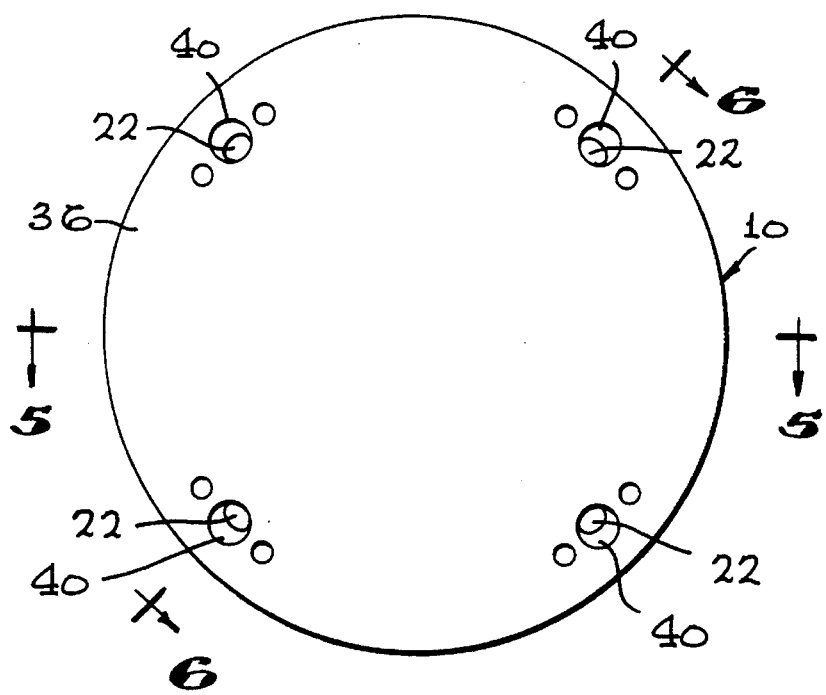
FIG. 8 is a front elevational view of the outer probe body of FIGS. 5 and 6.
Figure 10:
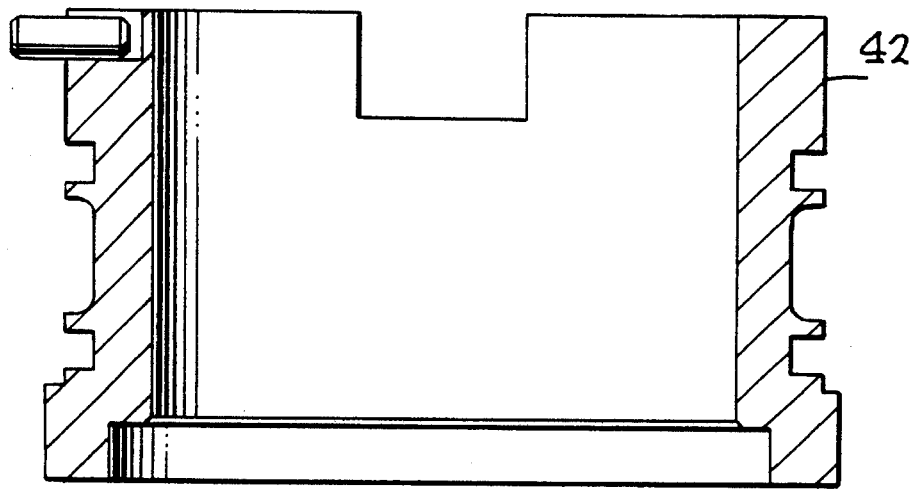
FIG. 10 is a diametrical sectional view of the probe housing of this invention.
Figure 12:
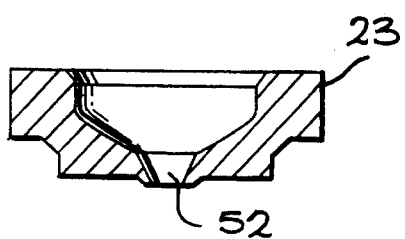
FIG. 12 is a diametrical sectional view of the gate insert of this invention.
Figure 13:
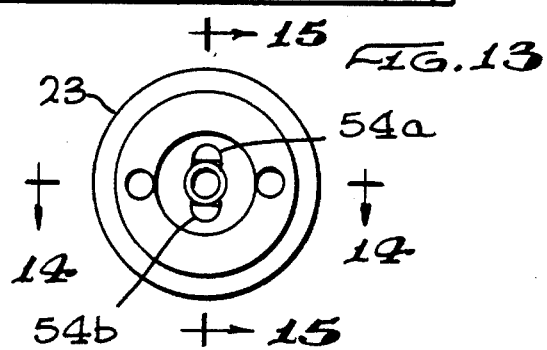
FIG. 13 is a front elevational view of the gate tip of this invention.

Reference is now made to FIGS. 1 through 4 of the drawing in combination with FIGS. 2 and 3, showing a probe assembly, generally designated 10, restrained between a front plate 11 and a rear plate 12 to provide molding material to a injection mold assembly 13 having a hot side 14 and an ejector side 15. The injection mold assembly 13, typically has a large number of cavities, for example, 128, two of which, 16a and 16b, appear in FIG. 1. The cavities, 16a, 16b, 16c, 16d are arranged in the hot side 14 in groups such as four in number as depicted in FIG. 18, to be fed in the direction of the dashed arrows in FIGS. 1 and 4 with molding material MM from a common manifold, unshown in the drawing, but simulated by manifold assembly 21 via the probe assembly 10, a central passage 32, its internal runners 22, two of which may be seen in FIG. 1 and gates 23, one associated with each mold cavity.

The plates 11 and 12 containing the major length of the probe assembly 10 as well as the hot side plate 14 of the injection mold assembly 13 are aligned by guide pins such as pin 50 of FIG. 1. Plates 11 and 12 are secured together and are fixed within the injection molding machine by bolts, unshown. The ejector side 15 separates from the hot side 14 at the part line, P/L, for each mold cycle to allow ejection of the molded parts 24, of FIG. 4, as is well known in the injection molding art.

As is indicated above, there may be tremendous separating forces present due to the cross sectional area of mold material MM at or near the zero temperature line, ZTL, between the front plate 11 and hot side plate 14. The separation forces may be as high as fifteen to twenty times the normal or high molding pressure of only 2,000 psi. These separation forces have been known to cause a separation at the zero temperature line ZTL resulting in the destruction of prior design probes as well as the molded parts in process. This problem is solved by my new probe assembly 10 which is accompanied design without any change in the mold or molding machine design.

FIG. 2 shows the hot side plate 14 of a typical mold assembly with four mold cavities 16a, 16b, 16c and 16d in a square array to be fed as shown in FIGS. 1 and 4 with molten molding material MM by a single probe assembly 10 through individual internal runners 22. Heater connectors 17 are shown at the top of the mold hot side 14 as well as lift straps 18. Cooling water connections 19, guide pin bushings 49 and several fasteners are also shown.

FIG. 3 shows the mating ejector side of the mold assembly 13 with the four cavities 16a, 16b, 16c and 16d, cooling water connections 19, guide pin bushings 49, and guide pins 50 used to insure alignment between the hot side 14 and the ejector side 15 as they come together for a molding cycle.

Referring now specifically to FIG. 4 in combination with FIGS. 1 and 6–9, the probe assembly 10 comprises a two-part probe body, the probe outer body 34 and the probe inner body 35 with the inner body 35 telescoping into the outer body 34 at mating surfaces 30 and 31, respectively. Both the probe outer body 34 and probe inner body 35 are fabricated with a common central passage 32 which communicates with the manifold assembly 21 and with the runners 22. The probe body parts 34 and 35 are preferably coaxially mounted withinwith the passage 32 extending along the longitudinal axis of the two body parts 35 and 35. Note that the passage 32 also communicates with a washer shaped recess 33 between the forward end of the inner probe body part 35 and the bottom of the rear recess of the outer probe body 34. The probe body parts 34 and 35 are dimensioned so that the washer like recess 33 is present and filled with molding material MM at all molding temperatures and pressures.

The front face 36 of probe assembly 10 is best seen in FIG. 8, but also appearing in FIGS. 1, 4, 5, 6, 16 and 17, is flat and has four orifices 40 for the four runners 22 shown in dotted lines in FIG. 5 and communicating with the central passage 32 for supplying molten molding material MM to four gates 23 and four mold cavities 16a, 16b, 16c and 16d of FIGS. 1–3 in the mold hot side 14. Behind the face 36, as best seen in FIGS. 4–6, is a reduced diameter body length, L, which contains the passage 32 and is surrounded by a band heater 41 of FIGS. 1 and 4 in conventional probe design. The band heater 41 is located in an air space, AS, of FIGS. 1 and 4. The rear or inner end 55 of the probe outer body part 34 is positioned by locator 38 within an opening in the rear plate 12.

The locator 38 performs a number of important functions. First, it centers and precisely positions the probe assembly 10 within the opening, AS. Next, the locator 38 provides an annular bearing surface 38B for the probe inner body part 35. Thirdly, the locator 38 provides the mating tapered surface 38CS for the tapered outer end of the outer probe body 34. Upon expansion of the probe outer and inner parts 34 and 35, these tapered surfaces provide compressive forces for sealing the slip fit joint between the mating surfaces 30 and 31 of the probe body parts 34 and 35. This is all accomplished while allowing for thermal expansion of the inner and outer probe body parts 34 and 35 as the probe assembly 10 is heated from ambient outside temperature, e.g., 77 degrees F. (25 degrees C.) to typical molding temperatures of 340 to 540 degrees F. (177 to 288 degrees C.).

The front face 36 of the probe assembly 10 is positioned within the front plate 11 by tubular housing member 42 of FIGS. 1, 4, 10 and 11. An annular groove 43 in the front face of the tubular housing member 42 engages an outer lip 36L on the front face 36 of the outer probe body 34 positioning the outlets or orifices 40 adjacent to gate tips 52. The male mold member 46 in the ejector side and its associated molded part ejector 47 may be clearly seen in FIG. 1.

Adjacent to the gate tips 52, within the female mold 45 are gate housings 23 of FIG. 4. Just behind the gate housing 23 of each mold cavity 16a–d is a respective gate chamber 51a–d which is filled with molding material MM at all times during molding operations. Two mold cavities 16a and 16b of the four mold cavities 16a–d and two gate chambers 51a and 51b of the four gate chambers 51a–d appear in FIG. 4. Between mold shots, the molding material MM in the gate chambers 51, the outlets 40, the runners 22, the passage 32 and recess 33 will remain molten and with proper temperature control of the heater bands 41 and cooling through passages in the mold, remain at molding temperature without overheating or degradation. The balancing of temperatures is well known in the molding art; however, the probe assembly 10 of this invention facilitates temperature control as is described below.

The gate housing 23 is closed by gate tip 52 which is shown in two 90 degree different diametrical sections in FIGS. 14 and 15 with FIG. 15 corresponding to the view in FIG. 4. The gate tips 52 have two ports which allow the flow of molding material MM from the orifice 40 to the mold cavities 16a,b. The gate tips 52 virtually closes off the actual molding orifice 53 between mold shots by absorbing the heat of the small amount of molding material MM at the mold orifice 53 and thereby allowing opening of the mold, removal of the molded part without any dripping of excess molding material MM from the molding orifice 53.

TEMPERATURE COMPENSATION

For an understanding of the temperature compensation features of this invention, reference is again made to FIGS.

1 and 4 which shows the base or zero temperature line ZTL located at the junction of the front plate 11 and the hot side plate 14 of the mold 13. A rear reference line, RRL is located at the junction of the manifold assembly 21 and the rear face of the probe inner body 35. It is essential that the distance D between the zero temperature line ZTL and the rear reference line, RRL remain constant during all times particularly during heating for the first mold cycle and thereafter throughout the series of molding cycles or shifts as the molding operation continues. In the past, the lack of stability of this dimension, although not recognized by many molders, has been a problem which sometimes resulted in the loss of parts and, more important, by in damage to the probes or the molds.

Various fasteners such as internally located machine bolts, unshown in the drawing, hold the front plate 11 and the rear plate 12 together and external clamps hold the front plate 11 and the rear plate 12 with as many as 32 probe assemblies 10 to the manifold 21 so that the distance D remains constant between the zero temperature line ZTL and the rear reference line RRL of the probe assembly 10.

Maintaining this standard distance D is possible since the component of the entire assembly which undergoes the greatest temperature changes and cycling is the probe assembly 10. The probe outer body part 34 and the probe inner body part 35 telescope freely with temperature changes while the overall length of the probe assembly 10 does not change and essentially remains constant. A slip fit relationship is present between the cylindrical walls of the interfitting probe outer body part 34 and the probe inner body part 35 while a tapered compression fit seal exists between the probe outer wall 34 CS of the outer body part 34 at its rear end 55 which is depicted at the upper portion of FIG. 4 and the tapered inner wall 38 CS of the locator 38. As indicated above, the mating of these tapered walls 34CS and 38CS of the locator 38 also as shown in FIG. 4 and the outer body part 34 by wedging together as the temperature rises in the probe assembly 10 produces a radial compression force between the telescoping surfaces 30 and 31 of the outer and inner body parts 34 and 35, respectively, to seal the washer shaped recess 33 and to prevent any molding material MM from leaving the recess 33 via that seal.

An indication, although somewhat exaggerated for purposes of illustration of the extent of thermal expansion is seen by comparing FIGS. 16 and 17 in which the size of the internal washer shaped reservoir 33 for molding material MM enlarges in thickness in FIG. 17 as compared with FIG. 16. Lengths L1 and L2 will grow with heating; however, distance D remains constant.

INTERNAL PRESSURE COMPENSATION

The washer shaped reservoir or recess 33 expands and contracts in thickness with temperature changes of the probe assembly 10. The diameter of the washer shaped reservoir or recess 33 remains constant and both faces, forward face 33F and rear face 33R are exposed to the same pressure. The rear face 33R exerts pressure against the inner probe body 35 and that pressure is applied against the manifold assembly 21. The same pressure is applied by the forward face 33F against the probe outer body 34 tending to balance the pressures which are exerted in the gate housings 23 and the cavities 16. This balancing of pressures in the direction of the longitudinal axis of the probe assembly 10 is a major advantage of this invention.

The actual diameter of the washer shaped reservoir or recess 33 is defined by the sizes of the various other reservoirs from the manifold assembly 21 to the actual mold gate chamber 51. This relative size relationship is proportionately illustrated by graphically representation in FIG. 18. There it may be seen that the cross sectional area of the reservoir or recess 33 minus the correctional area of combined passage 32 is larger than the combined cross sectional areas of the gate chambers 51a through 51d. The principal separating force within the probe assembly 10 is the force which tends to maintain the probe assembly 10 in its stable condition and does not tend to separate the probe assembly 10 from the mold assembly 13 during normal and even abnormal, excess pressure or temperature conditions.

The forgoing constitute my disclosure of the best mode known by me at the time of filing this patent application for carrying out this invention. The embodiment shown is, however, only illustrative and does not limit the scope of the inventive concept. It is recognized that one of skill in the molding art may produce an operative assembly which may have differences without departing from the true concept of this invention. Therefore, this invention is defined, not by the illustrative embodiment but rather by the following claims including the protection afforded by the Doctrine of Equivalents.

What is claimed is:

1. A probe for an injection molding apparatus comprising a probe body:

said probe body comprising a pair of body parts including regions in telescoping relationship and having a molding material passage therethrough;

a first of said pair of probe body parts having a rear mounting surface for mounting with said passage in communication with a source of molding material;

a second of said body parts including at least one runner communicating with said passage and the front face of said second of said body parts;

said front face having at least one molding material outlet communicating with at least one mold cavity through said runner and said outlet;

the front face of said probe being in sealing relationship with said mold cavity;

the telescoping region of said body parts defining an annular molding material filled cavity when the probe is supplied with molding material;

said annular cavity having a transverse cross section greater than the combined cross section of said outlet whereby molding material within said annular cavity applies sealing pressure between the probe and the mold and said source of molding material.

2. A probe in accordance with claim 1 wherein said mold includes gate cavities having a transverse cross section area, one for each mold cavity; and the transverse cross section of said annular cavity being greater than the combined transverse cross section area of said gate cavities.

3. The probe in accordance with claim 1 wherein the second of said probe body parts is in thermal conductive relationship with a heater for maintaining the molding material within said bore and said annular cavity in a fluid molding condition and whereby said probe body parts may change the regions of telescoping relationship as a function of temperature responsive changes in length of said body parts.

4. The probe in accordance with claim 1 wherein the first of said pair of probe bodies includes a planar rear face for sealing contact with said source of molding material.

5. A probe in accordance with claim 1 wherein said passage bore extends partially through said second probe body part and said second probe body part includes an enlarged bore extending through said second probe body part;

said first of the pair of probe body parts having an outside surface corresponding to the inside surface of the enlarged bore of said second of said pair of probe body parts whereby said first of said pair of probe body parts telescope into said enlarged bore;

the inner end region of the enlarged bore of said second of said probe body parts and the end of said first of said prove body parts defining said annular cavity.

6. A probe in accordance with claim 1 wherein said enlarged bore has a length, said second body part has a length and the length of said enlarged bore of said second probe body part and the length of the first probe body part are dimensioned to maintain the annular cavity at all operating and nonoperating normal conditions.

7. A probe in accordance with claim 1 wherein said pair of probe body parts are coaxial and said passage is on the longitudinal axis of said coaxial body parts.

8. A probe in accordance with claim 1 including locator means defining a rear mounting surface for said second probe body part;

said locator means comprising an annular ring.

9. A probe in accordance with claim 8 wherein said locator means and said second body part include mating tapered annular surfaces.

10. A probe in accordance with claim 1 for use with a multi cavity mold wherein said probe includes one runner and one outlet for each cavity in said mold to be supplied with molding material; and wherein the cross sectional area of said cavity is greater than the combined cross sectional area of said outlets.

11. A probe assembly for use in an injection molding apparatus including a manifold source of molten molding material under pressure and a mold having at least one mold cavity and a gate for molding material and a gate cavity adjacent to a mold cavity comprising:

a probe including a body defining a molding material passage for receiving molten molding material from said manifold, at least one outlet on a front face of said body;

said front face of said body defining a first reference plane;

said outlet communicating with a mold cavity to supply molten molding material thereto;

means mounting said probe with the front face on a mating reference plane with respect to said mold;

said probe body comprising a pair of partially telescoping parts, a first of said parts including said front face first reference plane and a second of said parts defining a second face providing a second reference plane;

means for maintaining said first and second reference planes at a substantially fixed distance throughout normal molding operations;

whereby changes in length of said probe due to thermal effects are compensated by changes in the amount of partial telescoping of said body parts without affecting the overall combined length of said probe body telescoping parts and said substantially fixed distance between said first and second reference planes.

12. In an injection molding apparatus having a manifold for supplying molten molding material, the manifold defining a first reference plane and said injection molding apparatus including a mold defining at least one mold cavity and the mold defining a second reference plane, wherein the improvement comprises;

a probe comprising a two part body; said body comprising a first body part and a second body part, said second body part overlapping said first body part wherein a longitudinally extending molding material passage extends through said first and second body parts;

each of said first and second body parts including a respective surface mating with one of said reference planes;

the amount of overlapping of said body parts being a function of the thermal expansion of said body parts;

said first and second body parts defining a molding material cavity therebetween for providing molding material pressure biasing said body parts apart and each of said body parts toward a respective one of said reference planes.

13. In an injection molding apparatus in accordance with claim 12, the improvement wherein said first and second body parts are coaxial.

14. In an injection molding apparatus in accordance with claim 13, the improvement wherein the passage extends along the axis of said coaxial body parts.

15. In an injection molding apparatus in accordance with claim 12 wherein said two part body includes a front face on said first body part, said front face engaging the surface on said injection molding apparatus defining said second reference plane and the second body part has a rear face engaging the surface of said manifold defining said first reference plane and including means for maintaining said front face and said rear face at substantially fixed distance apart;

said means for maintaining said front face and said rear face at a substantially fixed distance apart comprises said molding material pressure applied to the surfaces of said body parts defining said cavity to bias said parts apart and toward said reference surfaces.

16. In an injection molding apparatus in accordance with claim 12 the improvement wherein the molding material cavity of said probe includes opposing planar transverse surfaces whereby mold material pressure is applied against both of said planar transverse surfaces tending to reduce the amount of overlap of said probe body parts; and wherein said opposing transverse surfaces are longitudinally spaced With respect to the path of molding material from the source of molding material to the mold cavity.

17. A temperature compensated probe assembly for an injection molding apparatus adapted to be located between a source of molten molding material and a mold having at least one cavity;

said probe assembly having a longitudinal axis and comprising first and second probe parts;

said first probe part including a surface adapted for sealing engagement with the source of molding material and including a passage therethrough communicating with the source of molten molding material;

said second probe part including a surface adapted for sealing engagement with said mold and including at least one molding material passage therethrough;

wherein said first and second probe parts are in sealed overlapping relationship whereby changes in length due to thermal expansion of either part along the longitudinal axis changes the overlap without changing the sealing engagement of respective sealing surfaces on the source of molten molding material and the mold;

wherein the passages of said first and second probe parts are in communication whereby molding material under pressure may flow from the source of molten molding material to the mold;

wherein said probe parts define a molding material holding recess therebetween; and wherein said molding material holding recess and said passage have a lateral dimension normal to the longitudinal axis of said probe assembly, the lateral dimension of said recess being greater that the lateral dimension of said passages.

18. A probe assembly in accordance with claim 17 wherein said first and second probe parts are coaxial and telescoping.

19. A probe assembly in accordance with claim 17 wherein said molding material holding recess is annular in shape.

20. A probe assembly in accordance with claim 17 wherein the mold is multi-cavity and said second probe part includes a plurality of outlets for providing molding material to multiple mold cavities wherein said molding material holding recess has an area in the lateral direction greater than the combined areas of said plurality of outlets.

21. A probe assembly in accordance with claim 20 wherein said probe body parts defining said recess are longitudinally spaced from each other whereby pressure of molding material within said recess exerts sealing force between said first probe body part and the source of molding material and between said second probe body part and the mold.

22. A probe assembly in accordance with claim 18 wherein said body parts are tapered in the telescoping portion thereof to provide sealing therebetween.

23. A probe assembly for an injection molding apparatus, comprising:

a probe outer body and a probe inner body operably arranged in telescoping relationship relative to each other and having a molding material passage therethrough;

the probe inner body having a rear mounting surface for mounting with said passage in communication with a source of molding material;

the probe outer body having an outermost surface and including at least one runner communicating with said passage and the front face of said probe outer body parts;

said front face of said probe assembly having at least one molding material orifice communicating with at least one mold cavity through said runner and said outlet;

the front face of said probe being in sealing relationship about said mold cavity;

the telescoping relationship of said probe body parts defining an annular molding material filled recess when the probe is supplied with molding material;

said annular recess having a transverse cross-section greater than the combined cross section of said orifice whereby molding material within said annular recess applies sealing pressure between the probe and the mold and said source of molding material.

24. A probe assembly in accordance with claim 23 wherein said mold includes gate cavities, one for each mold cavity; and wherein the cross section of said annular cavity is greater than the combined cross section of said gate cavities.

25. The probe assembly in accordance with claim 23 wherein the outermost portion of said probe body parts is in operative thermal transfer relationship with a heater for maintaining the molding material within said bore and said annular cavity in a fluid molding condition and whereby relative to the extent of the telescoping relationship said probe body parts may change as a function of temperature responsive changes in length of said probe body parts.

26. The probe assembly in accordance with claim 23 wherein the first of said pair of probe bodies includes a planar rear face for sealing engagement with the complementary surface of said source of molding material.

27. A probe assembly in accordance with claim 23 wherein said passage extends partially through said probe outer body part and said probe outer body part includes an enlarged bore extending through said probe outer body part;

said probe inner body part having an outside dimension corresponding to the dimension of the enlarged bore of said outer probe body part whereby said probe inner body part telescopes into said enlarged bore;

the inner end region of the enlarged bore of said probe outer body part and the end of said probe inner body part defining said annular recess.

28. A probe assembly in accordance with claim 23 wherein the length of said enlarged bore of said probe outer body part and the length of the probe inner body part are dimensioned to maintain the annular recess molding material filled at all operating and nonoperating normal conditions whereby molding material pressure applies separating pressure to said body parts.

29. A temperature compensated probe assembly for an injection molding apparatus adapted to be located between a source of molten molding material and a mold having at least one cavity;

said probe assembly having a longitudinal axis and comprising first and second probe parts;

said first probe part including a surface adapted for sealing engagement with the source of molding material and including a passage therethrough communicating with the source of molten molding material;

said second probe part including a surface adapted for sealing engagement with a mold and including at least one molding material passage therethrough;

said first and second probe parts in sealed overlapping relationship whereby changes in length due to thermal expansion of either part along the longitudinal axis changes the amount of overlapping relationship without changing the sealing engagement of respective sealing surfaces on the source of molten molding material and the mold;

said first and second probe parts defining a molding material filled recess therebetween;

wherein the passages of said first and second probe parts are in communication whereby molding material under pressure may flow from the source of molten molding material to the mold and the pressure of molding material in said recess biases said first and second mold parts apart respectively toward said source of molten molding material and said mold.

30. A probe assembly in accordance with claim 29 wherein said molding material holding recess and said passages have a lateral dimension normal to the longitudinal axis of said probe assembly;

said lateral dimension of said recess being greater than the lateral dimensions of said passages.

31. A probe assembly in accordance with claim 30 wherein said first and second probe parts are coaxial and telescoping.

32. A probe assembly in accordance with claim 30 wherein the lateral dimension of said molding material holding recess is annular in shape.

33. A probe assembly in accordance with claim 30 wherein the mold is multi-cavity and said second probe part includes a plurality of outlets for providing molding material to multiple mold cavities; and wherein said molding material holding recess has an area in the lateral direction greater than the combined areas of said plurality of outlets.

34. A probe assembly in accordance with claim 33 wherein said probe body parts defining said recess are longitudinally spaced from each other whereby pressure of molding material within said recess exerts sealing force between said first probe body part and the source of molding material and between said second probe body part and the mold.

35. A probe assembly in accordance with claim 31 wherein said probe body parts are tapered in the telescoping portion thereof to provide sealing therebetween.

* * * * *